No. 782,454. PATENTED FEB. 14, 1905.
W. LINTERN.
CAR OR TRAIN SIGNAL.
APPLICATION FILED AUG. 4, 1904.
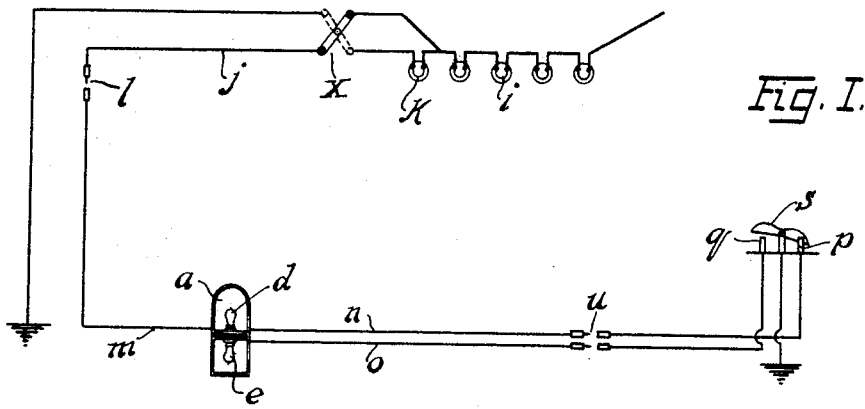
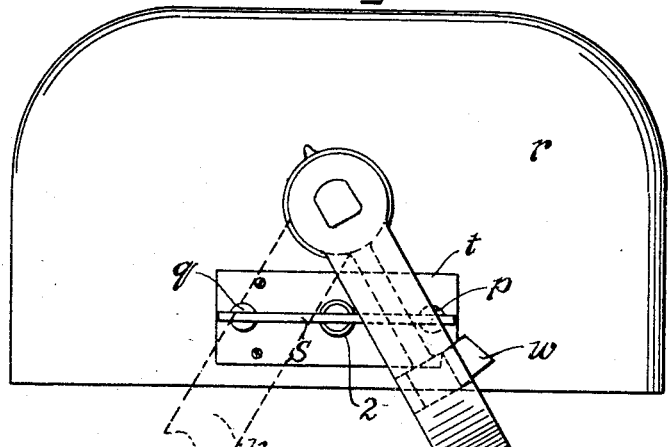
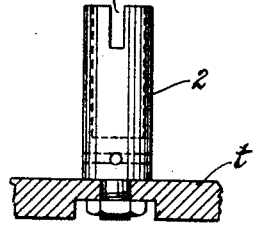
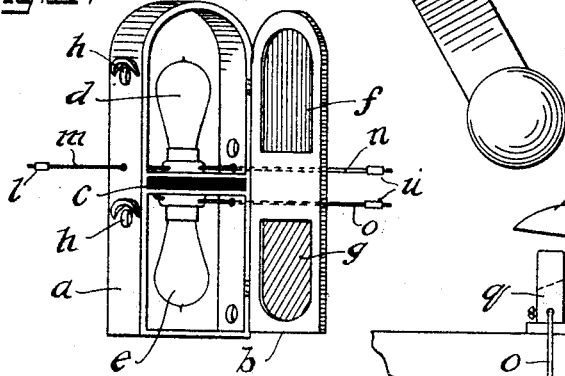
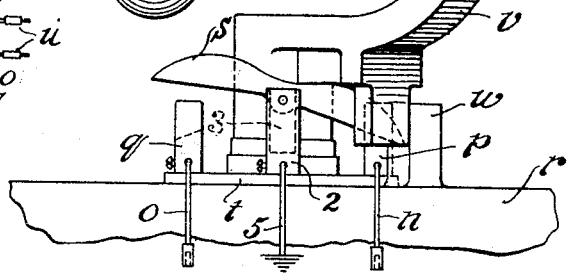
Witnesses:
F. C. Valentine
M. A. Ward
Inventor,
William Lintern,
by Luther G. Hopper,
Attorney.

No. 782,454. Patented February 14, 1905.

UNITED STATES PATENT OFFICE.

WILLIAM LINTERN, OF WEST PARK, OHIO.

CAR OR TRAIN SIGNAL.

SPECIFICATION forming part of Letters Patent No. 782,454, dated February 14, 1905.

Application filed August 4, 1904. Serial No. 219,469.

*To all whom it may concern:*

Be it known that I, WILLIAM LINTERN, a citizen of the United States, residing at West Park, in the county of Cuyahoga and State of Ohio, have invented certain new and useful Improvements in Car and Train Signals, of which the following is a specification.

This invention relates to signal-lights carried by cars, trains, or motor-vehicles, preferably upon the rear ends thereof; and its purpose is primarily to attract the attention of the operator of a car, train, or vehicle which may be following.

One of the most exacting details of the operation of cars at night is to keep apprised of the movements of a preceding car; and my present invention is designed to provide for displaying differently-colored signal-lights upon a car or train, so as to give notice instantly to the operator of a following car of the application or shutting off of power and constantly as to whether the power is on or off in the car ahead. This enables the operator of a car following to govern his actions positively, thereby avoiding collisions and much wasteful and indecisive alternating applications of power and brakes.

Further objects of the invention are, to provide such apparatus of simple construction and which can be readily installed in a car and operated by the usual appliances of the car without requiring any additional movements or attention by the operators of said car.

To these ends my invention consists in the features and combinations hereinafter described and claimed, an embodiment thereof as applied to an electric-motor car of the usual type being illustrated in the accompanying drawings, in which—
Figure I is a diagrammatic view showing the electrical wiring of the apparatus. Fig. II is a plan view, and Fig. III is a front elevation, of the upper part of an electric controller, showing the operating-switch. Fig. IV is a rear elevation of the signal-box. Fig. V is a detailed elevation of the switch-socket.

The reference-letter $a$, Figs. I and IV, indicates a signal-box provided with a door $b$ and adapted to be secured in any suitable way to a car, preferably at the rear end thereof.

The box $a$ is divided into an upper and lower compartment by a horizontal partition $c$, composed of an electrically non-conducting substance, such as fiber. An electric lamp $d$, preferably of the incandescent type, is mounted upon the upper side, and a similar lamp $e$ depends from the lower side of the partition $c$. It is evident that groups of lamps can be substituted in place of the single lamps $d$ and $e$.
The door $b$, which opens toward the rear when the box is properly secured to the car, is provided with upper and lower apertures opposite to the respective lamps, in which are secured differently-colored panes of glass or other suitable material, the upper pane $f$ being preferably red and the lower pane $g$ being preferably green. It is obvious that the same colored light effect could be secured by employing a red-glass globe in the lamp $d$ and a green-glass globe in the lamp $e$, which may be done, if desired. The box $a$ should be provided with suitable ventilating-apertures $h$, Fig. IV, and may be of any suitable material; but I now prefer to make it of cast-iron lined with asbestos.

The electric current to operate the signal-lamps may be supplied from any available source; but where there are electric lamps in the car or train I prefer to proceed as follows:
One of the lamp-circuits of the car is indicated at $i$ in the diagram Fig. I, and one of these lamps, $k$, may be cut out of the series, as by shifting a four-poled switch $x$, as shown, a wire $j$ therefrom being extended to a point near the signal-box $a$ and terminating in one member of a coupling $l$, preferably the female member thereof. A wire $m$, leading from the signal-box $a$, where it connects with the positive terminals of both the signal-lamps $d$ and $e$, is provided with the other member of the coupler $l$, so that it may be joined to the wire $j$. A wire $n$ leads from the negative terminal of the signal-lamp $d$ and is connected to the pole $p$ of the double-poled center-balanced switch, mounted upon the top of the controller-box $r$, and the wire $o$ connects the negative terminal of the lamp $e$ with the pole $q$ of said switch. Couplers $u$ are provided in the wires $n$ and $o$ to permit the removal of the box $a$.

The double-poled switch comprises a plate $t$ of any suitable electrically non-conducting material which is screwed or otherwise secured to the top of the controller-box $r$ of the car in close proximity to the stop-lug $w$ thereof, and a centrally-fulcrumed metallic lever $s$, mounted upon said plate $t$ in position to be operated by the controller-lever $v$, as shown in Figs. II and III. The upper surface of the switch-lever $s$ is curved, so that its middle portion and its extreme ends are depressed, as shown, the elevated portions being adapted to engage the lower edge of the controller-lever $v$, by means of which the switch-lever is tilted to engage with one or the other of the switch-pole standards $p$ or $q$, the said standards having forked or slotted ends to receive and hold the respective ends of the switch-lever.

It is important, to prevent tampering with the signal-lights, that the switch-lever $s$ be readily removable, so that it may be transferred to another controller in the opposite end of the car or upon another car. This may be accomplished by providing a suitable socket for the lever in its fulcrum-post, or the fulcrum-post may be made in two parts, as shown herein, the lower part 2 being a socket rigidly secured to the plate $t$ and the lever $s$ being hinged to a plug 3, adapted to fit into said socket. Slots 4 are formed in the socket to keep the lever $s$ from swinging laterally. A ground-wire 5 is led from the fulcrum-post; but in cases where the controller is electrically grounded the post 2 may be screwed into or otherwise attached to the controller-top and the ground-wire dispensed with.

It will now be readily understood that when the handle-lever $v$ of the controller is in the "off" position, as shown in Figs. II and III, and no electric current is being supplied to the traction-motors of the car the switch-lever $s$ will be in contact with the pole $p$ and disengaged from the pole $q$, which closes the circuit through the red lamp $d$, thus warning the operator of a following car or train. As power is supplied to the traction-wheels the controller-lever $v$ is swung around to the left, Fig. II, and when it has reached the position shown by the dotted lines the switch-lever $s$ will have been tilted into contact with the pole $q$ and disengaged from the pole $p$, thus closing the circuit of the green lamp $e$ and giving notice to the operator following that the preceding car is receiving power. In order to avoid sparking and differences of potential at the switch-poles, I arrange the switch so that one of the circuits will in each case be closed before the other circuit is opened.

For trains of electric cars operated by a master-controller, which in turn operates a main controller upon each car, I prefer to equip each car of the train with the signal system and operate the respective switch-levers $s$ by the main controllers of each car. This method avoids the coupling of the conducting-wires $n$ and $o$ between the cars, as would be necessary if the switch $s$ were operated by the master-controller, and it is evident that by throwing the switch $x$ in the cars of the train in which the signal is not required the signal-circuit may be opened and the lighting-circuit $i$ closed. It is also evident that groups of lamps can be worked from the main controllers by the introduction of switches operating in conjunction with the main controllers independently of the lighting-circuits of the cars, since, as stated above, any available source of power may be employed.

Having now so fully described my invention that those skilled in the art to which it appertains may make and use it, either in the form shown herein or under some modification thereof, what I claim as new, and desire to secure by Letters Patent, is—

1. A car or train signal comprising a lighting system operated according as power is supplied to or shut off from the traction-wheels of the car or train, substantially as set forth.

2. A car or train signal comprising differently-colored lamps, and means for causing said lamps to glow alternately according as power is supplied to or shut off from the traction-wheels of the car, substantially as set forth.

3. A car or train signal comprising differently-colored lamps, and means adapted to be operated by the power-controller of the car for causing said lamps to glow alternately according as power is supplied to or shut off from the traction-wheels of the car, substantially as set forth.

4. A car or train signal comprising a pair of lamps one of which is arranged to produce a differently-colored light effect from the other, means whereby one of said lamps is caused to glow upon the application of power to the traction-wheels of the car, and means for causing the other of said lamps to glow upon the shutting off of power to said traction-wheels, substantially as set forth.

5. A car or train signal comprising a group of lamps some of which are arranged to produce differently-colored light effects from that produced by the others, means whereby some of said lamps are caused to glow upon the application of power to the traction-wheels of the car, and means for causing the others of said lamps to glow upon the shutting off of power to said traction-wheels, substantially as set forth.

6. In a car or train signal, the combination with means for controlling the application of power to operate the car, of signal-lamps operated through a switch which is operated by the movements of the main controller as power is applied to or shut off from the traction-wheels of the car, substantially as set forth.

7. In a car or train signal, the combination with means for controlling the application of power to operate the car, of lamps arranged to produce differently-colored light effects, and means operated by said controlling means for causing said lamps to glow alternately according as power is applied to or shut off from the traction-wheels of the car, substantially as set forth.

8. In a car or train signal, the combination with means for controlling the application of power to operate the car, of electric lamps arranged to produce differently-colored light effects, and a switch adapted to be operated by said controlling means whereby the electric circuit through one or another of said lamps may be closed or opened according as power is applied to or shut off from the traction-wheels of the car, substantially as set forth.

9. In a car or train signal, the combination with means for controlling the application of power to operate the car, of a pair of electric lamps one of which is arranged to produce a differently-colored light effect from the other, and a switch adapted to be operated by said controlling means having one of its poles in the electric circuit of one of the said lamps and its other pole in the circuit of the other lamp, substantially as set forth.

10. In a car or train signal, the combination with means for controlling the application of power to operate the car, of groups of electric lamps one of which groups is arranged to produce a differently-colored light effect from the other, and a switch adapted to be operated by said controlling means having one of its poles in the electric circuit of one of the said groups and its other pole in the circuit of the other group, substantially as set forth.

11. In a car or train signal, the combination with means for controlling the application of power to operate the car, of a pair of electric lamps one of said lamps being adapted to produce a light effect of a different color from the other, a switch-lever adapted to be operated by said controlling means having an electrically-grounded fulcrum, and switch-poles connected respectively in the electric circuits of said lamps and adapted to engage alternately with the ends of said switch-lever, substantially as set forth.

12. In a car or train signal, the combination with means for controlling the application of power to operate the car, of groups of electric lamps adapted to produce differently-colored light effects, a switch-lever adapted to be operated by said controlling means having an electrically-grounded fulcrum, and switch-poles connected respectively in the electric circuits of said lamps and adapted to engage alternately with the ends of said switch-lever, substantially as set forth.

13. In a car or train signal, the combination with means for controlling the application of power to operate the car, of a signal-box, electric signal-lamps mounted in said box so as to show differently-colored light effects, and means operated by said controlling means for causing said lamps to glow alternately according as power is applied to or shut off from the traction-wheels of the car, substantially as set forth.

14. In a car or train signal, the combination with means for controlling the application of power to operate the car, of a pair of electric lamps having their positive terminals connected in the same circuit and one of said lamps being adapted to produce a light effect of a different color from the other, a switch-lever adapted to be operated by said controlling means having an electrically-grounded fulcrum, and switch-poles connected respectively to the negative terminals of said lamps and adapted to engage alternately with the ends of said switch-lever, substantially as set forth.

15. In a car or train signal, the combination with means for controlling the application of power to operate the car, of groups of electric signal-lamps having their positive terminals connected in the same circuit and arranged to produce light effects of different colors, a switch-lever adapted to be operated by said controlling means having an electrically-grounded fulcrum, and switch-poles connected respectively to the negative terminals of said groups of lamps, and adapted to be engaged alternately by the ends of said switch-lever, substantially as set forth.

In testimony whereof I affix my signature, in the presence of two subscribing witnesses, at Cleveland, Ohio, this 2d day of August, 1904.

WILLIAM LINTERN.

Witnesses:
JNO. T. SULLIVAN,
M. A. WARD.